Figure 1:
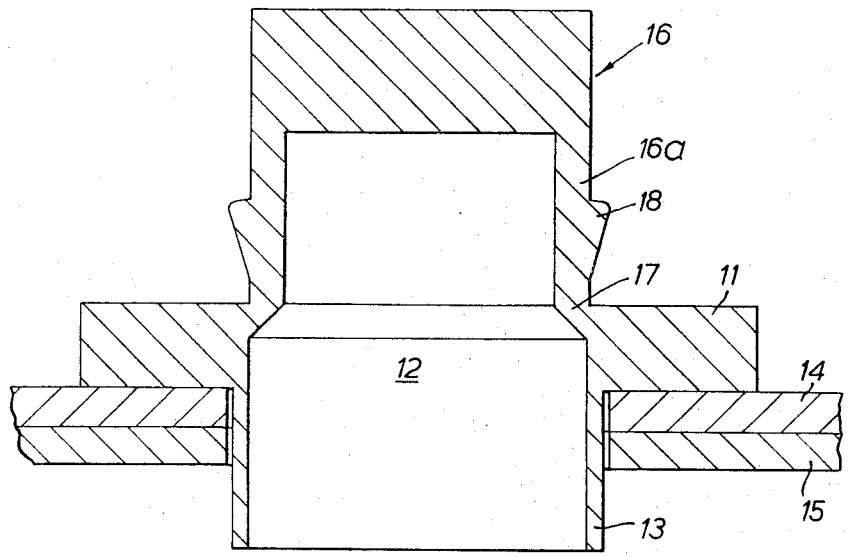

Sept. 12, 1967   A. J. BENNETT   3,340,762

ONE PIECE BLIND RIVET

Filed Nov. 30, 1964

INVENTOR
ALAN JAMES BENNETT
BY
Peare, Petzer & Peare
ATTORNEY 3,340,762
ONE-PIECE BLIND RIVET

Alan James Bennett, Pontypridd, Glamorgan, South Wales, assignor to Tinnerman Products, Inc., Cleveland, Ohio, a corporation of Ohio Filed Nov. 30, 1964, Ser. No. 414,546
2 Claims. (Cl. 85—72)

This invention relates to blind rivets, that is to say a rivet which can be fixed in position from one side of a plate or panel to which it is to be attached.

One object of the present invention is to provide a one-piece rivet, such as a moulding made of a synthetic resin plastics material, which can be manufactured simply and cheaply for use in securing together a pair of superimposed metal sheets or plates, such a rivet having many applications in the car industry.

It has previously been proposed to form a blind rivet with a plurality of bulbous fingers extending from one side of a rivet head, and a straight sided pin which is driven through the head to tilt the fingers outwardly. Another object of the invention is to provide a blind rivet which avoids the weakness and manufacturing complexity of individual fingers by replacing such fingers with a tubular skirt and by providing a pin which has an external projection operative, when the pin has been driven through the head, to expand said skirt.

According to one aspect of the invention there is provided a blind rivet formed in one piece and comprising a head having an aperture therein, a radially-expandable skirt depending from one side of the head around said aperture, and a pin extending away from the opposite side of the head and being joined thereto along a shear line surrounding said aperture, the pin being shaped to pass through said aperture into said skirt upon receipt of a blow directed towards said head sufficient to shear it from the head, the pin having an enlarged resilient skirt-expanding portion adjacent the head whose external cross-sectional area is oversize relative both to said aperture and to the internal cross-sectional area of the skirt.

According to another aspect of the invention there is provided a blind rivet formed in one piece and comprising a head having an aperture therein, a radially stretchable tubular skirt depending from one side of said head, the skirt having an internal wall which forms a continuation of the boundary wall of said aperture, a pin upstanding from the opposite side of said head, the pin having an external wall which lies in alignment with said internal wall of the skirt, and a fillet connecting said pin to said head, said fillet being frangible to permit the pin to be driven through the head into the skirt, said pin having a resilient portion, adjoining the head, formed externally with at least one wedge shaped skirt-expanding projection which tapers towards said head.

Figure 2:
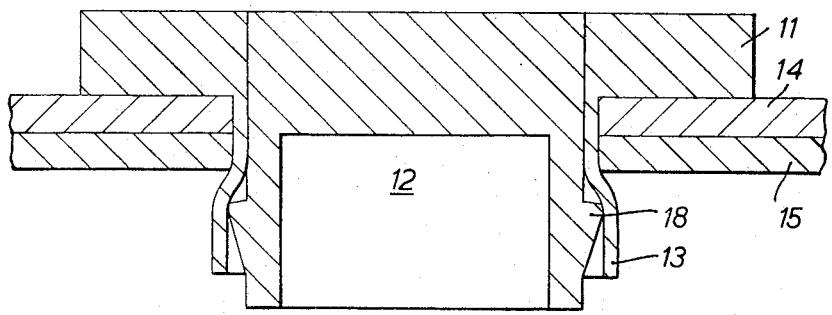

Other objects and features of the invention will be pointed out in, or be apparent from, the specification and claims, as will obvious modifications of the single embodiment shown in the drawings in which:

FIG. 1 is an axial section through a blind rivet, in accordance with the invention, shown in position ready for fixing; and FIG. 2 is a corresponding view of the rivet of FIG. 1 shown in its fixed state.

As shown in the drawing, the rivet comprises a rivet head 11, in particular of circular shape, having a central circular aperture 12, the shank of the rivet being formed by a right cylindrically continuous skirt 13 which is integral with the head and depends from the portion of the head immediately surrounding the central aperture. The wall of this skirt is sufficiently thin to be resiliently deformable, and its length is slightly greater than the combined thickness of the plates 14, 15 to be secured together by the rivet. Also integral with the head is a locking pin 16 which is upstanding from the side of the head remote from the shank and comprises a cylindrical portion 16*a* which is closed at its upper end and has an outer diameter at said end approximately equal to the inner diameter of the aperture in the head and the shank-forming-skirt. At its lower end, this cylindrical portion is secured to the head by a frangible fillet 17 extending along a shear line surrounding the aperture in the head.

Although the outer diameter of the pin, in general, is approximately the same as the inner diameter of the opening in the head and of the sleeve, a beading or projection 18 is formed around the end of the pin adjacent the head, this beading having a wedge-shaped cross-section and tapering inwardly in a direction towards the head. This beading renders the corresponding portion of the pin oversize in relation to interior of the skirt.

The two plates which are to be secured together by means of the rivet are provided with superimposed holes matching the outer diameter of the shank, and the rivet is fitted in position on the plates by passing the shank through the two superimposed holes. By striking the pin of the rivet with a blow directed towards the rivet head, the fillet securing it to the head is sheared and the pin is driven through the head, the hollow portion of the pin containing the beading being compressed to permit the beading to pass through the opening in the rivet head.

As the pin proceeds through the skirt forming the rivet shank, the beaded portion of the pin remains compressed since outward expansion of the skirt is prevented by its abutment with the periphery of the openings in the plate. However, when the beading reaches the end portion of the skirt which projects beyond the plate and is therefore not supported by the plates, the beading expands outwardly to relieve the compressive stress and therefore stretches outwardly the surrounding end portion of the skirt. Since the beading is flared outwardly it acts like an arrowhead or fish hook in preventing withdrawal of the pin or separation of the plates since the plates are now locked between the head of the rivet and the expanded portion of the skirt.

The length of the rivet pin above the beading is such that when the outer end of the pin is driven flush with the upper surface of the rivet head, the beading of the rivet pin lies within the portion of the skirt which projects beyond the two plates which are to be locked together.

Although, in the embodiment described above, the pin is stated to be hollow to permit inward flexing of that portion which supports the beading, the pin particularly in small size rivets, can be solid if the beading itself is sufficiently resilient to be compressed and so permit the pin to pass through the head.

Moreover, the beading need not be continuous around the pin, but can be formed by spaced apart beading portions or even mere projections.

The head may be cylindrical or of any other desired shape. In particular the periphery of the head can be undercut to form a recess for receiving a part to be supported. Thus, for example, when the rivet is used on an automobile panel, the undercut head can serve to support a trim, the inturned edges of the trim engaging in the recess and gripping the head on opposite sides thereof.

The rivet head, shank and pin are made in one piece as a moulding in plastics, such as nylon, or other suitable material.

I claim:
1. A unitary, one-piece blind rivet fastening device made from polymeric material adapted for insertion through an opening in a support member, said device comprising a hollow head having a generally cylindrical internal wall section, a radially expandable tubular skirt portion depending downwardly from one side of said head and being adapted to be received through the opening in a support member, the skirt portion having an internal cylindrical wall which forms a continuation of the internal boundary wall of said head, an upstanding hollow, cylindrical pin extending upwardly from said head on the side opposite said skirt portion, said pin having a closed top and having an outer wall and an inner opening, said outer wall having a cylindrical upper external portion disposed in axial alignment with the internal wall of said skirt portion, the said wall of said pin having a greater cross-sectional thickness as compared to the wall thickness of said skirt portion, and being sufficiently resilient to permit radially inward movement and at least partial radially outward return movement of a portion of the pin wall, the external diameter of said upper wall portion of the pin being substantially equal to the internal diameter of said skirt portion, and said pin having an integral annular projection adjacent said head, said projection being tapered and having an external dimension which reduces in a direction towards said head from a value greater than, to a value at least substantially equal to, the internal diameter of said skirt portion, a frangible fillet joining said pin to said head, whereby upon axially directed external pressure against the head of said pin, said pin moves downwardly and axially inwardly of the head and skirt portion causing shearing of the fillet and radially inward movement of the pin wall caused by the interaction of said projection and said boundary wall of the head aperture as the end of said pin adjacent said projection moves through said head and, whereafter, the resiliency of the pin wall causes radial outward movement of the pin wall adjacent the projection as the projection engages the internal wall of the skirt portion so as to cause radial expanding of said skirt portion outwardly into locking engagement with a support member adjacent the opening therein.

2. A fastening device in accordance with claim 1, wherein said head aperture is cylindrical for a portion of the axial thickness of the head adjacent said skirt portion, and frusto-conical tapering radially inwardly adjacent the juncture of the head with said fillet.

References Cited
UNITED STATES PATENTS

| | | | |
|---|---|---|---|
| 2,592,130 | 4/1952 | Erb et al. | 85—82 |
| 2,876,485 | 3/1959 | Cowles | 85—82 |
| 2,956,468 | 10/1960 | Macy | 85—72 |
| 3,147,525 | 9/1964 | Texier | 85—77 |
| 3,232,161 | 2/1966 | Fernberg | 85—72 |

FOREIGN PATENTS

| | | |
|---|---|---|
| 1,370,201 | 7/1964 | France. |
| 885,876 | 12/1961 | Great Britain. |

CARL W. TOMLIN, *Primary Examiner.*

M. PARSONS, JR., *Assistant Examiner.*